United States Patent
Fie et al.

(10) Patent No.: US 12,286,813 B2
(45) Date of Patent: Apr. 29, 2025

(54) SELECTIVELY OPERABLE DOOR FOR AN AUTONOMOUS DEVICE

(71) Applicant: HUSQVARNA AB, Huskvarna (SE)

(72) Inventors: Arnie Fie, Rock Hill, SC (US); Chris Price, Charlotte, NC (US); Trent Cook, Anderson, SC (US); Scott Kirkpatrick, Hickory, NC (US); Joe Racz, Gastonia, NC (US); Chris Roth, Harrisburg, NC (US); Chad Jones, Cramerton, NC (US); Robert Schriever, Concord, NC (US)

(73) Assignee: HUSQVARNA AB, Huskvarna (SE)

( * ) Notice: Subject to any disclaimer, the term of this patent is extended or adjusted under 35 U.S.C. 154(b) by 231 days.

(21) Appl. No.: 18/011,640

(22) PCT Filed: Sep. 28, 2021

(86) PCT No.: PCT/US2021/052349
§ 371 (c)(1),
(2) Date: Dec. 20, 2022

(87) PCT Pub. No.: WO2022/132281
PCT Pub. Date: Jun. 23, 2022

(65) Prior Publication Data
US 2023/0258023 A1 Aug. 17, 2023

Related U.S. Application Data

(60) Provisional application No. 63/124,955, filed on Dec. 14, 2020.

(51) Int. Cl.
*E05B 47/00* (2006.01)
*E05B 65/00* (2006.01)
(Continued)

(52) U.S. Cl.
CPC .......... *E05B 47/0001* (2013.01); *E05B 65/00* (2013.01); *G05D 1/0265* (2013.01);
(Continued)

(58) Field of Classification Search
CPC ...... E05B 47/00; E05B 47/0001; E05B 65/00; E05B 2047/005; E05B 2047/0067;
(Continued)

(56) References Cited

U.S. PATENT DOCUMENTS

| 4,560,912 A | 12/1985 | Joensson |
| 6,082,046 A | 7/2000 | Simmons |

(Continued)

FOREIGN PATENT DOCUMENTS

| CN | 204609411 U | 9/2015 |
| CN | 108550202 A | 9/2018 |
| WO | 2020205300 A1 | 10/2020 |

OTHER PUBLICATIONS

International Search Report and Written Opinion for International Application No. PCT/US2021/052349 mailed Jan. 21, 2022.

*Primary Examiner* — Suzanne L Barrett
(74) *Attorney, Agent, or Firm* — Burr & Forman LLP

(57) ABSTRACT

A selectively operable door (50) for a robotic vehicle (10) may include a doorframe disposable in a barrier dividing two areas in which the robotic vehicle (10) is enabled to travel, a door body (54) hingedly connected to the door frame (52), and a latching assembly configured to alternately allow movement of the door body (54) such that the robotic vehicle (10) to enabled to pass through the selectively operable door (50) via displacement of the door body (54) and prevent movement of the door body (54) such that the door body (54) is retained in a closed state. The latching assembly may include an automatic lock configured to define a release position in which movement of the door (Continued)

body (54) from the closed state is allowed, and a capture position in which movement of the door body to the closed state is allowed and movement of the door body from the closed state is prevented.

19 Claims, 11 Drawing Sheets

(51) Int. Cl.
*G05D 1/00* (2006.01)
*A01D 34/00* (2006.01)
*A01D 101/00* (2006.01)

(52) U.S. Cl.
CPC ........ *A01D 34/008* (2013.01); *A01D 2101/00* (2013.01); *E05B 2047/005* (2013.01); *E05B 2047/0067* (2013.01); *E05B 2047/0072* (2013.01); *E05B 2047/0094* (2013.01)

(58) Field of Classification Search
CPC .... E05B 2047/0072; E05B 2047/0094; G05D 1/0265; A01D 34/008; A01D 2101/00
USPC .......................................................... 70/91
See application file for complete search history.

(56) References Cited

U.S. PATENT DOCUMENTS

| | | | |
|---|---|---|---|
| 6,209,262 B1 | 4/2001 | Mathis | |
| 7,178,289 B2 | 2/2007 | Gierl et al. | |
| 10,145,071 B2 | 12/2018 | Marabyan et al. | |
| 10,159,181 B2 | 12/2018 | Crandall et al. | |
| 2013/0293368 A1* | 11/2013 | Ottah | G08B 23/00 |
| | | | 340/426.1 |
| 2016/0186485 A1 | 6/2016 | Taylor | |
| 2018/0035606 A1* | 2/2018 | Burdoucci | A01D 34/008 |
| 2018/0255705 A1* | 9/2018 | Keski-Luopa | A01D 34/008 |
| 2019/0054327 A1* | 2/2019 | Perez | E05B 47/026 |
| 2019/0136563 A1* | 5/2019 | Crandall | G05D 1/0265 |
| 2022/0195752 A1* | 6/2022 | Fischer | B01L 1/00 |
| 2023/0203842 A1* | 6/2023 | Jaiswal | E05C 3/24 |
| | | | 49/386 |

* cited by examiner

US 12,286,813 B2

SELECTIVELY OPERABLE DOOR FOR AN AUTONOMOUS DEVICE

TECHNICAL FIELD

Example embodiments generally relate to robotic vehicles and, more particularly, relate to a door that selectively operates to enable a robotic vehicle to pass through.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. More recently, robotic mowers and/or remote controlled mowers have also become options for consumers to consider.

Robotic mowers are typically confined to operating on a parcel of land that is bounded by some form of boundary (e.g., defined by a wire or other methods). The robotic mower is capable of detecting the boundary and operating relatively autonomously within the area defined by the boundary. However, in some cases, a physical boundary (e.g., a fenced in yard or portion thereof) may only be part of the operating area inside which the robotic mower is intended to operate. For example, while front yards or traditionally not fenced in, a back yard may indeed be fenced in. Meanwhile, it may be desirable for the robotic mower to operate within both the front yard and the back yard. In a situation like this, or in other situations where it may be desirable to have the robotic mower pass from one area to another without sacrificing the security, privacy or integrity of a barrier such as a wall or fence.

BRIEF SUMMARY OF SOME EXAMPLES

Some example embodiments may therefore provide a selectively operable door for passage of a robotic vehicle. The selectively operable door may include a door frame disposable in a barrier dividing two areas in which the robotic vehicle is enabled to travel, a door body hingedly connected to the door frame, and a latching assembly configured to alternately allow movement of the door body such that the robotic vehicle to enabled to pass through the selectively operable door via displacement of the door body and prevent movement of the door body such that the door body is retained in a closed state. The latching assembly may include an automatic lock configured to define a release position in which movement of the door body from the closed state is allowed, and a capture position in which movement of the door body to the closed state is allowed and movement of the door body from the closed state is prevented.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
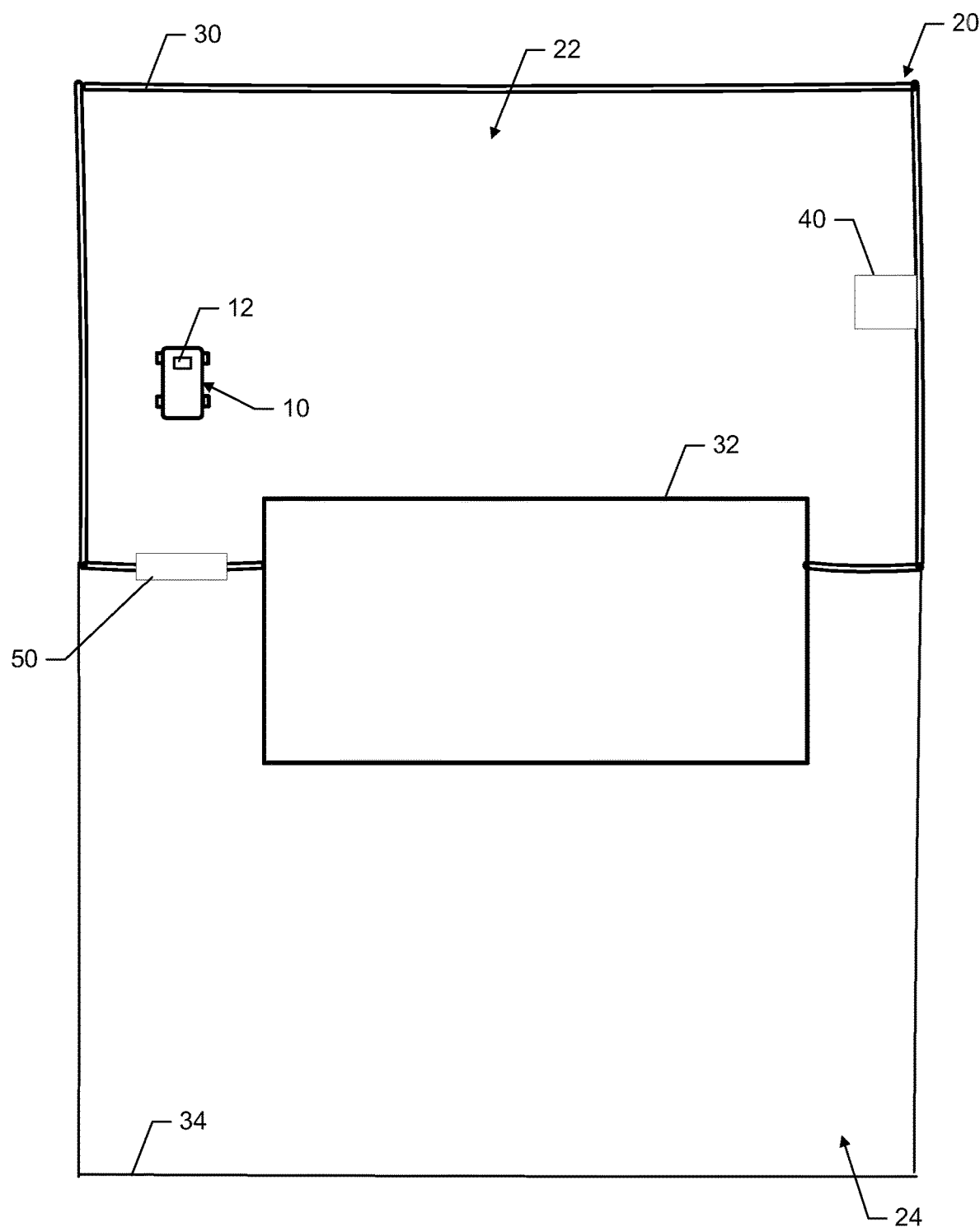
FIG. 1 illustrates an example operating environment for a robotic vehicle of an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "yard maintenance" is meant to relate to any outdoor grounds improvement or maintenance related activity and need not specifically apply to activities directly tied to grass, turf or sod care. As used herein, operable coupling should be understood to relate to direct or indirect connection that, in either case, enables functional interconnection of components that are operably coupled to each other.

Robotic mowers, which are one example of a robotic vehicle of an example embodiment, typically mow an area that is defined by a boundary that bounds the area to be mowed. The robotic mower roams within the bounded area to ensure that the entire area is mowed, but the robotic mower does not go outside of the bounded area. When operating in a fenced in area, the fence could form the boundary either actually or by virtue of having a boundary wire buried proximate to the fence. However, if the robotic mower needs to exit the fenced in area for any reason several issues may arise. First, a breach may be required in the fence to enable the robotic mower to leave the fenced in area. Second, if some type of door is used to avoid defining a breach, the door may not be secure, or otherwise may require manual operation that inhibits operation of the robotic mower. If the door is automated with respect to opening, the amount of power consumption that is generated by unlocking the door when the robotic mower comes near without intending to go through the door can lead to excessive battery drain or other waste of power.

Example embodiments may provide a selectively operable door that makes it possible to preserve the integrity and continuity of the fence with respect to enclosing the fenced in area by avoiding introduction of a non-secure portion of the fence. Example embodiments may also enable the robotic vehicle (e.g., robotic mower) to easily (and autonomously) pass through the fence (i.e., via the selectively operable door) to reach other service areas and/or a charging station of the robotic vehicle. Additionally, example embodiments may provide operability of the door in such a way that minimizes the incidence of false positive or unnecessary unlock cycles for the door.

Although a robotic mower is one example of a device that may employ the selectively operable door of an example embodiment, it should be noted that other robotic vehicles may also work in connection with such a device. For example, robotic vehicles that are configured as mobile sensing devices, watering devices, fertilizing devices, spraying/spreading machines, and/or the like) may also use example embodiments. In this regard, while the robotic vehicle operates within boundaries (which can be defined by any of a number of different ways), the robotic vehicle may perform a function, and may be intelligent enough to avoid (and possibly even classify) objects it encounters by employing contactless sensors, while further enabling the robotic vehicle to navigate through a doorway into a physically separated portion of a parcel that is serviced by the robotic vehicle. By enabling the robotic vehicle to accurately determine its position and experience its surroundings, including interactions with a selectively operable door, some example embodiments may greatly expand the capabilities and the performance of robotic vehicles.

A boundary wire may be one way to define the boundary. However, since a boundary wire can be difficult to install in some areas, other strategies may be employed in some cases. For example, global positioning system (GPS), dead reckoning, local positioning beacons, physical boundaries or even visual fixing relative to various structural markers may alternatively be employed to locate and retain the robotic vehicle within the boundary. A robotic vehicle may therefore be provided that can operate and stay within boundaries that can be defined by any of a number of different ways. Moreover, the robotic vehicle may be intelligent enough to pass through a door into a physically separated portion of a service area.

FIG. 1 illustrates an example operating environment for a robotic vehicle 10 that may be employed as a deicing robot in connection with an example embodiment. However, it should be appreciated that example embodiments may be employed on numerous other robotic vehicles, so the robotic vehicle 10 should be recognized as merely one example of such a vehicle. The robotic vehicle 10 may operate to mow grass in a service area 20 (i.e., a parcel of land on which the robotic vehicle 10 is operable). The service area 20 includes a first portion 22 and a second portion 24 that are physically separated from each other. In this example, the first portion 22 is a back yard that is enclosed by a first boundary, which is a fence 30. Notably, a structure 32 (e.g., a house or other building) may also form part of the first boundary.

The first boundary may be defined using one or more physical boundaries (e.g., the fence 30, wall, curb, building, boundary wire and/or the like), or programmed location based boundaries or combinations thereof. When the first boundary 30 is detected, by any suitable means, the robotic vehicle 10 may be informed so that the robotic vehicle 10 can operate in a manner that prevents the robotic vehicle 10 from leaving or moving outside the boundary 30.

In the example of FIG. 1, the service area 20 also includes a second portion 24, which may be a front yard (which is not fenced in this example). As noted above, a portion of the fence 30 (and the structure 32) separates the first portion 22 from the second portion 24 of the service area 20. The second portion 24 of the service area 20 may be enclosed by a second boundary 34. The second boundary 34 in this example may be a boundary wire. However, as noted above, other means of defining the second boundary 34 may be used in some cases. Moreover, it should be understood that if the second boundary 34 and the first boundary are both defined by boundary wires, the boundary wires could be the same continuous boundary wire or different boundary wires in alternative examples.

The robotic vehicle 10 may be controlled, at least in part, via control circuitry 12 located onboard the robotic vehicle 10. The control circuitry 12 may include, among other things, a positioning module and a sensor module, which will be described in greater detail below. Accordingly, the robotic vehicle 10 may utilize the control circuitry 12 to define a path (e.g., which may be random in some cases) for coverage of the service area 20 in terms of performing a task over the first and second portions 22 and 24 of the service area 20. In this regard, the positioning module may be used to guide the robotic vehicle 10 over the service area 20 and to ensure that full coverage (of at least predetermined portions of the service area 20) is obtained, while the sensor module may detect objects and/or gather data regarding the surroundings of the robotic vehicle 10 while the service area 20 is traversed.

If a sensor module is employed, the sensor module may include a sensors related to positional determination (e.g., a GPS receiver, an accelerometer, a camera, a radar transmitter/detector, an ultrasonic sensor, a laser scanner and/or the like). Thus, for example, positional determinations may be made using GPS, inertial navigation, optical flow, radio navigation, visual location (e.g., VSLAM) and/or other positioning techniques or combinations thereof. Accordingly, the sensors may be used, at least in part, for determining the location of the robotic vehicle 10 relative to boundaries or other points of interest (e.g., a starting point or other key features) of the service area 20, or determining a position history or track of the robotic vehicle 10 over time. The sensors may also detect collision, tipping over, or various fault conditions. In some cases, the sensors may also or alternatively collect data regarding various measurable parameters (e.g., moisture, temperature, soil conditions, etc.) associated with particular locations on the service area 20.

In an example embodiment, the robotic vehicle 10 may be battery powered via one or more rechargeable batteries. Accordingly, the robotic vehicle 10 may be configured to return to a charging station 40 that may be located at some position on the service area 20 in order to recharge the batteries. The batteries may power a drive system and a blade control system (or other functional element) of the robotic vehicle 10. However, the control circuitry 12 of the robotic vehicle 10 may selectively control the application of power or other control signals to the drive system and/or the blade control system to direct the operation of the drive system and/or blade control system. Accordingly, movement of the robotic vehicle 10 over the service area 20 may be controlled by the control circuitry 12 in a manner that enables the robotic vehicle 10 to systematically or randomly traverse the service area 20 while operating the blade control system to mow grass (or otherwise service) the service area 20.

The charging statin 40 may be disposed on either the first portion 22 or the second portion 24 of the service area 20. Thus, the fact that the charging station is in the first portion 22 in FIG. 1 should not be seen as limiting in any way. In order to enable the charging station 40 from operating on the second portion 24, the robotic vehicle 10 must have a way to pass between the first portion 22 and the second portion 24. Accordingly, a selectively operable door 50 (or simply "door") of an example embodiment may be provided in the fence 30. However, it should also be appreciated that the charging station 40 could be located in the structure 32, and the selectively operable door 50 may then be located in a wall of the structure 32.

Figure 2:
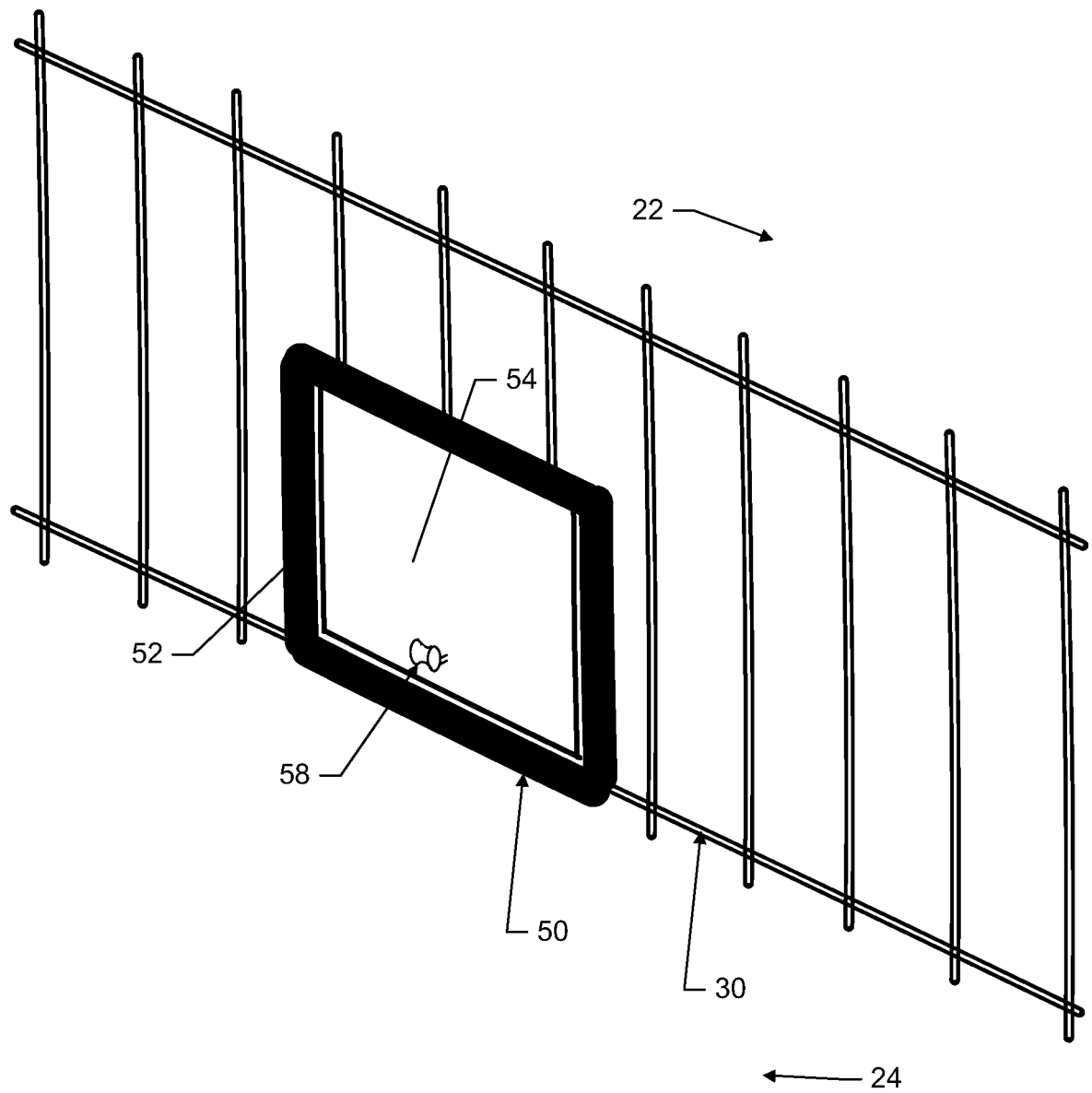
FIG. 2 illustrates a fence in which a selectively operable door of an example embodiment is located.

FIG. 2 illustrates a perspective view of the selectively operable door 50 of an example embodiment located in situ in the fence 30. The fence 30 in this example is made of a series of vertical and horizontal beams or bars. However, the fence 30 could take any form in alternative embodiments, and may be made of any material. The selectively operable door 50 may be disposed in a portion of the fence 30 proximate to the ground in order to enable the robotic vehicle 10 to drive through the selectively operable door 50 (and therefore also through the fence 30) without difficulty or interference.

As shown in FIG. 2, the selectively operable door 50 may include a number of physical components including a door frame 52 and a door body 54 that is hingedly attached to the door frame 52. Although not required, the door body 54 may typically be hingedly attached to a top or cross member of the door frame 52. The top or cross member of the door frame 52 may extend between two parallel door jambs on opposing sides of the door body 54. The door frame 52 may include a bottom member in some cases, but such bottom member is not required. Thus, the door body 54 may extend nearly to the ground or to the ground in some cases. If a bottom member is employed, the bottom member may be relatively thin (or ramped with a slight incline) to enable the robotic vehicle 10 to transit over the bottom member relatively easily.

In an example embodiment, the door body 54 may include an interface member 58 attached to each opposing side of the door body 54 (i.e., one interface member 58 facing the first portion 22 and one interface member 58 facing the second portion 24 of the service area 20). The interface member 58 may be used for one or more different functional interactions with the robotic vehicle 10. For example, in a simple case, the interface member 58 may be (or include) one or more rollers. In such an example, the robotic vehicle 10 may, when passing through the selectively operable door 50, contact the interface member 58 for minimizing any damage or friction with a body of the robotic vehicle 10. The rollers may therefore ensure that the physical appearance and exterior of the body of the robotic vehicle 10 does not become excessively damaged, marred or scratched. In other examples, the interface member 58 may have additional or alternative functions (as discussed in greater detail below).

Figure 3:
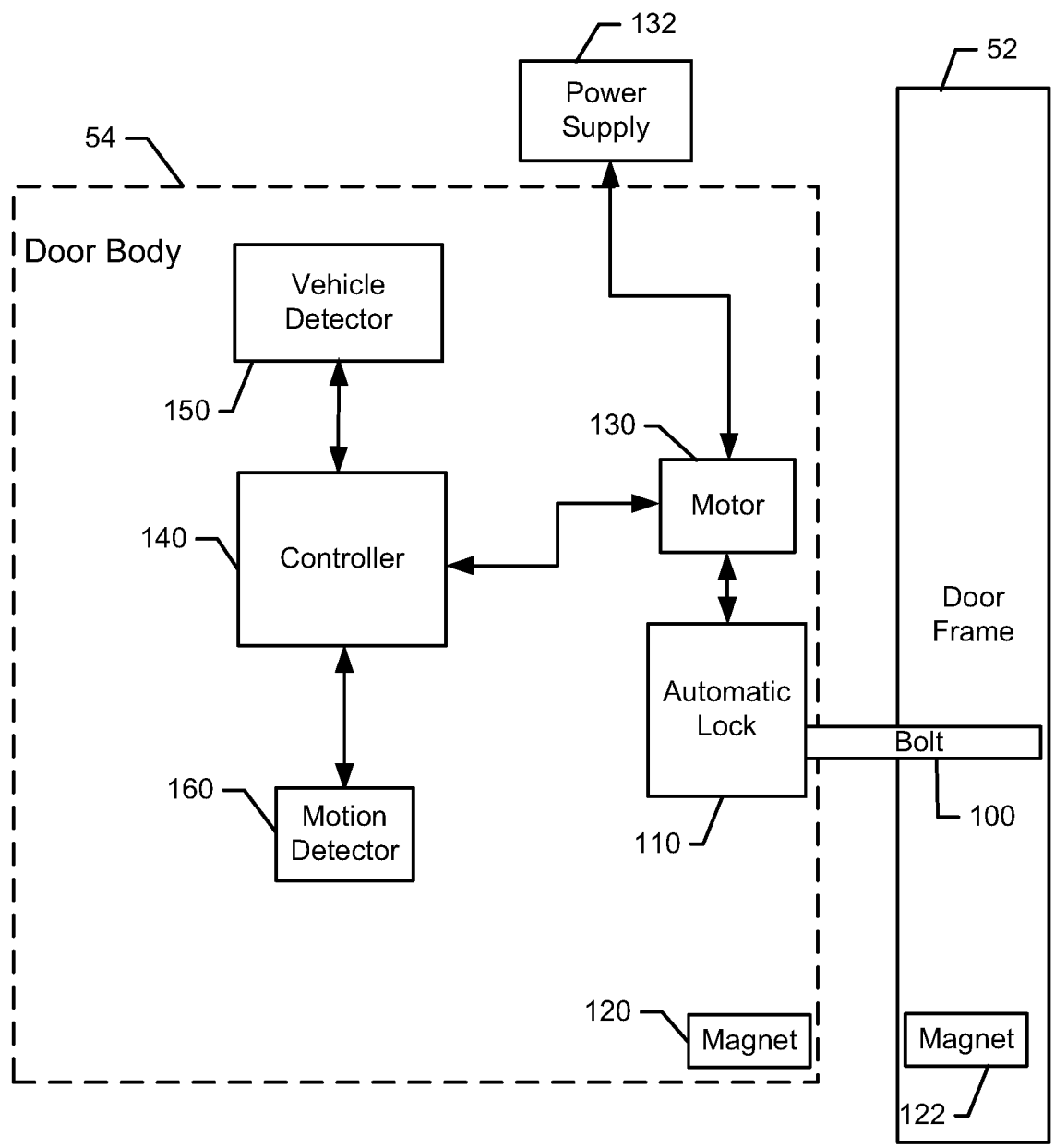
FIG. 3 illustrates a block diagram of various components that may be employed as part of a selectively operable door in accordance with an example embodiment.

FIG. 3 illustrates a block diagram of the selectively operable door 50 of an example embodiment. The selectively operable door 50 may include a latching assembly that is configured to alternately lock to prevent opening of the selectively operable door 50 and unlock to permit the robotic vehicle 10 to pass through the selectively operable door 50. The latching assembly may include components that may be embodied in a number of different ways. In the example shown in FIG. 3, the door frame 52 may have a bolt 100 extending therefrom toward the door body 54, to engage an automatic lock 110 disposed at the door body 54. The automatic lock 110 and the bolt 100 may therefore form the latching assembly (or portions thereof) in this example. In some cases, the automatic lock 110 may be inside the door body 54, and have portions thereof that are exposed to receive the bolt 100 when aligned therewith. However, it should be appreciated that the automatic lock 110 could alternatively be completely or partially located outside the door body 54. The locations of the bolt 100 and automatic lock 110 could also be reversed in some examples. In either case, when the door body 54 is in a closed state relative to the door frame 52, the automatic lock 110 and the bolt 100 may align with each other so that the automatic lock 110 can capture or retain the bolt 100 (e.g., in a locked or captured state).

In some examples, a magnet 120 may be disposed at a portion of the door body 54 that aligns with another magnet 122 disposed in the door frame 52 when the door body 54 is in the closed state. Accordingly, as the door body 54 swings (either freely or resisted by spring force), the magnets 120 and 122 will tend to attract each other to bring the door body 54 to a stop in the closed state. The automatic lock 110 will then also be brought into proper alignment with the bolt 100 so that operation of the automatic lock 110 alternately captures or releases the bolt 100 as described in greater detail below to lock and unlock, respectively, the door body 54 with respect to the door frame 52. When the door body 54 is locked with respect to the door frame 52, the selectively operable door 50 (or latching assembly) may also be considered to be locked. When the door body 54 is unlocked with respect to the door frame 52, the selectively operable door 50 (or latching assembly) may be considered to be unlocked.

When the selectively operable door 50 is unlocked, the robotic vehicle 10 may be enabled to pass through the selectively operable door 50 with minimal interference by pushing the door body 54 to swing on the hinge that connects the door body 54 to the door frame 52. When the selectively operable door 50 is locked, the robotic vehicle 10 may not be enabled to pass through the selectively operable door 50, and the door body 54 may be prevented from swinging out of the closed state on the hinge that connects the door body 54 to the door frame 52 by virtue of the automatic lock 110 capturing the bolt 100.

In an example embodiment, the automatic lock 110 may alternately capture or release the bolt 100 responsive to movement of a portion of the automatic lock 110. The automatic lock 110 may therefore define a release position in which the bolt 100 is released so that door body 54 can be moved relative to the door frame 52 and a capture position in which, movement of the door body 54 from the closed state relative to the door frame 52 is prevented, but movement of the door body 54 to the closed state (e.g., if the door body 54 is displaced from the closed state) is still possible. In some cases, a motor 130 may be operably coupled to the automatic lock 110 to drive the automatic lock 110 (or portion thereof) to alternately capture and release the bolt 100 (or at least move between respective capture and release positions that enable the capturing and releasing of the bolt 100, respectively). The motor 130 may be an AC or DC motor that is powered from a power supply 132. In an example embodiment, the power supply 132 may be a battery, and the motor 130 may be a DC motor (e.g., a brushless DC (BLDC) motor). However, in alternative embodiments, the motor 130 may be an AC motor and the power supply 132 may be mains power. The power supply 132 may be in the door frame 52 (or otherwise external to the door body 54) and connected to the motor 130 via wires that extend between the door frame 52 and door body 54 proximate to or via the hinge. However, the power supply 132 could alternatively be located in the door body 54 in some cases.

Operation of the motor 130 may be managed by a controller 140. The controller 140 may include processing circuitry (e.g., a processor and memory) that are configurable to respond to triggers provided thereto in order to instruct the motor 130 to operate to move the automatic lock 110 between the capture and release positions. In an example embodiment, the controller 140 may be operably coupled to a vehicle detector 150 that is configured to provide an opening trigger to the controller 140 when the robotic vehicle 10 is determined to be moving toward the selectively operable door 50 to pass therethrough. The opening trigger (or signal) may be an electric signal or mechanical signal as discussed in greater detail below, and the vehicle detector 150 may also take a number of forms as discussed below. Responsive to receipt of the opening trigger, the controller 140 may instruct the motor 130 to operate to move the automatic lock 110 (or portion thereof) to the release position.

In an example embodiment, the motor 130 may operate to move the automatic lock 110 (or portion thereof) to the capture position responsive to instruction from the controller 140 when the controller 140 has received a closing trigger (or signal) from a door motion detector (or simply motion detector 160). The motion detector 160 may be configured to detect movement of the door body 54 of at least a predetermined amount. In an example embodiment, the motion detector 160 may be an accelerometer, and the accelerometer may be configured to detect movement of the door body 54 of at least a predetermined amount (e.g., greater than 30 degrees of pivot about the hinge). Thus, the motion detector 160 may detect that the robotic vehicle 10 is moving through the selectively operable door 50 and has displaced the door body 54 relative to the door frame 52 by the predetermined amount, and may provide the closing trigger to the controller 140.

Figure 4:
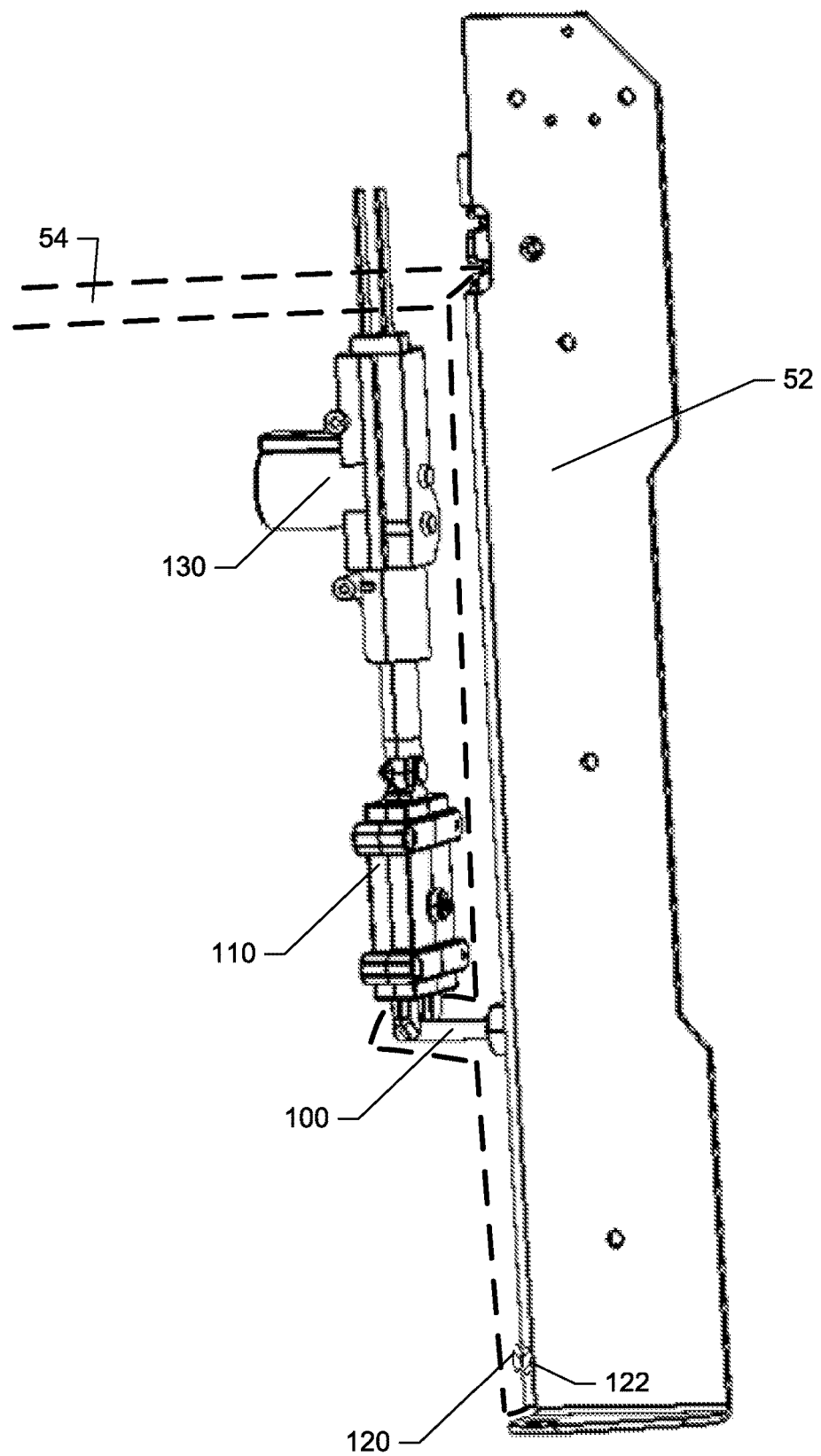
FIG. 4 illustrates a side view of portions of a door frame, motor and automatic lock of the selectively operable door in accordance with an example embodiment.

FIG. 4 illustrates a partial cutaway view of portions of the selectively operable door 50 in accordance with an example embodiment. In this regard, a portion of the door frame 52 is shown along with the door body 54 (in dashed lines). The door body 54 encloses the automatic lock 110 and the motor 130 therein. The door body 54 also includes an aperture inside which the bolt 100 may extend to be captured by the automatic lock 110. Meanwhile, the magnets 120 and 122 are disposed proximate to each other at a bottom portion of the door body 54 and door frame 52, respectively. However, the magnets 120 and 122 could alternatively (or additionally) be at other locations.

Figure 5:
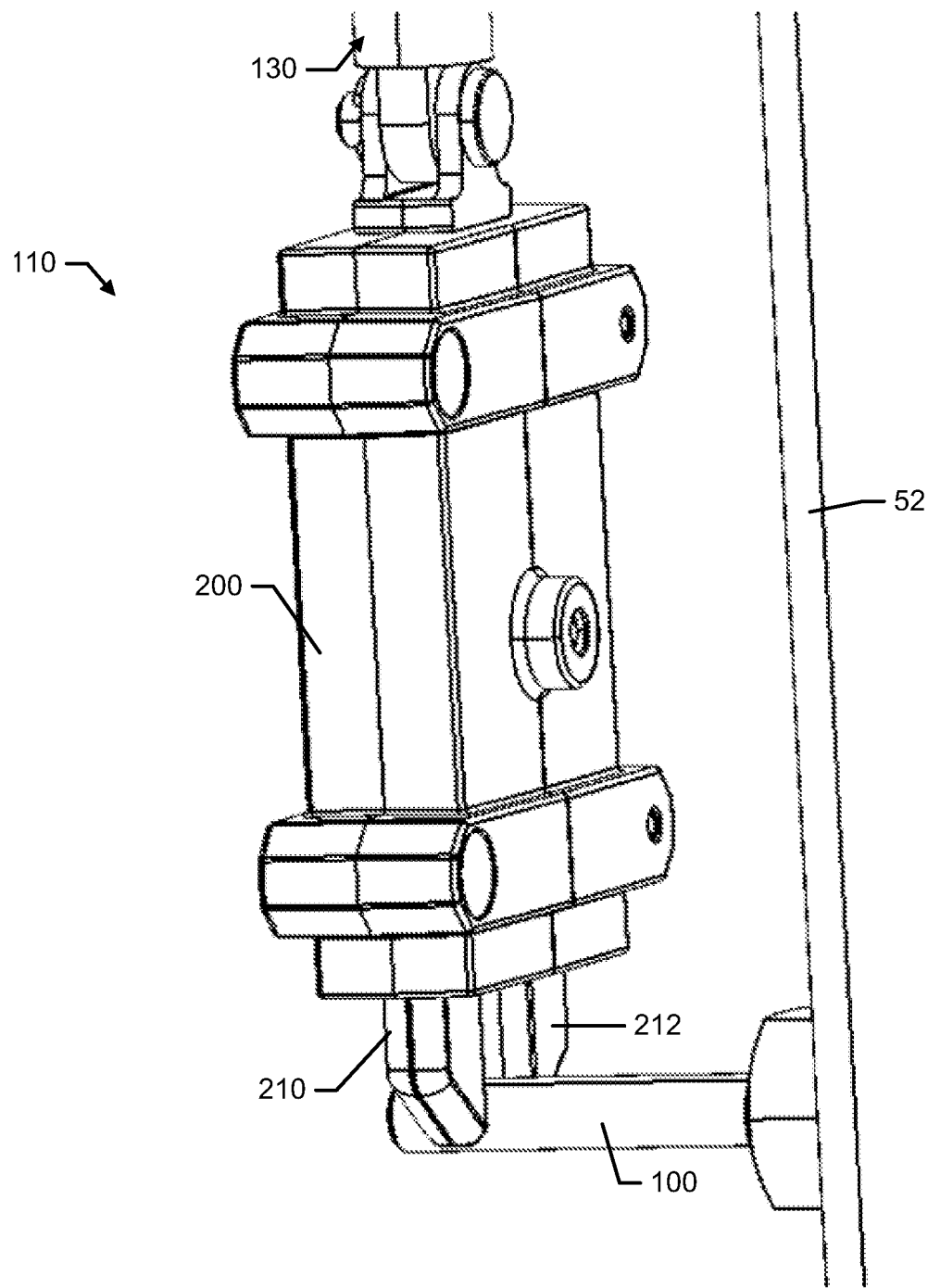
FIG. 5 illustrates a perspective view of a automatic lock in a capture position according to an example embodiment.
Figure 6:
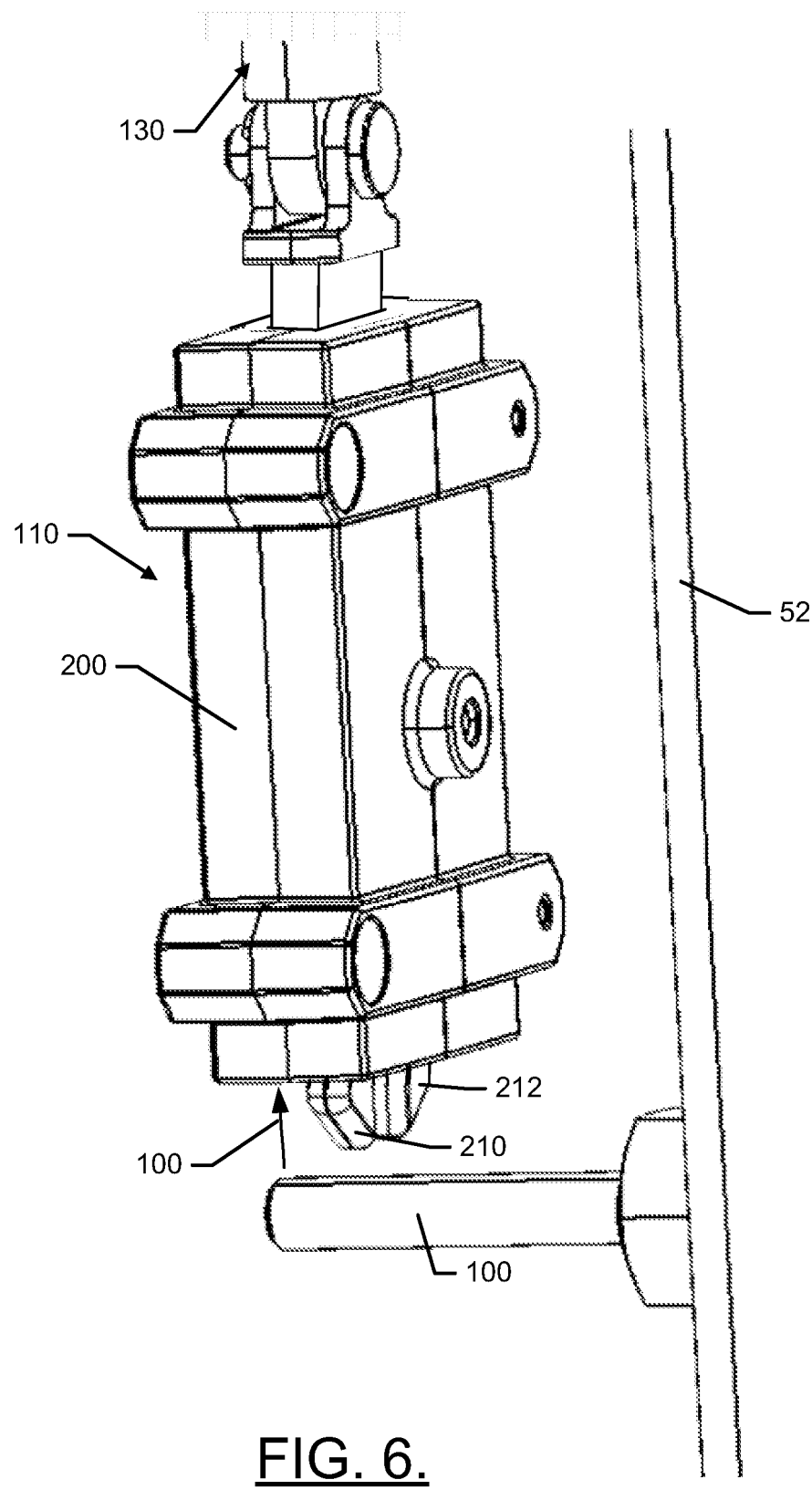
FIG. 6 illustrates a perspective view of the automatic lock transitioning to a release position according to an example embodiment.

FIGS. 5 and 6 illustrates a perspective view of the automatic lock 110 in the capture position (FIG. 5) and moving toward (or in) the release position (FIG. 6). As shown in FIG. 5, the automatic lock 110 may have a housing 200 from which a first capture element 210 and a second capture element 212 may extend. The first and second capture elements 210 and 212 may, in this case, extend from a bottom portion of the housing 200 to define the capture position. In this regard, when the first and second capture elements 210 and 212 are fully extended, the first and second capture elements 210 and 212 may be considered to be in the capture position (as shown in FIG. 5). To the extent the door body 54 is in the closed state while the first and second capture elements 210 and 212 are in the capture position, the first and second capture elements 210 and 212 may extend on opposite sides of the bolt 100 (as shown in FIG. 5).

The first and second capture elements 210 and 212 may be retractable into the housing 200 to transition to the release position. Thus, as shown in FIG. 6, the first and second capture elements 210 and 212 may move in the direction of arrow 214 such that they are no longer on opposing sides of the bolt 100, and therefore the automatic lock 110 and the door body 54 can move relative to the bolt 100 and the door frame 52, respectively. When the first and second capture elements 210 and 212 are retracted, both the first and second capture elements 210 and 212 may be incapable of touching the bolt 100. However, when not retracted (and therefore extended), the first and second capture elements 210 and 212 may be capable of contacting the bolt 100.

Figure 7:
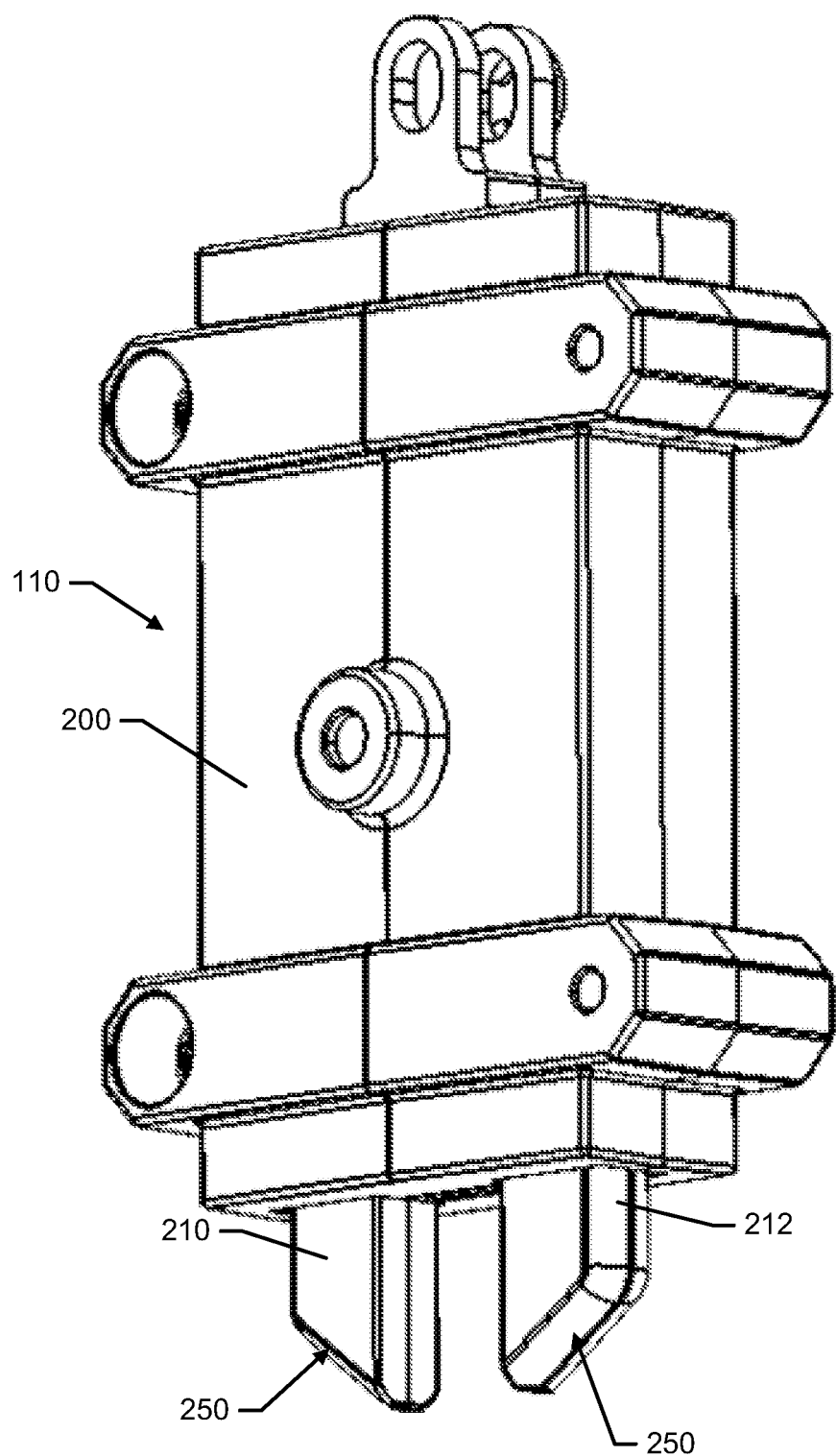
FIG. 7 shows a perspective view of the automatic lock in isolation according to an example embodiment.
Figure 8:
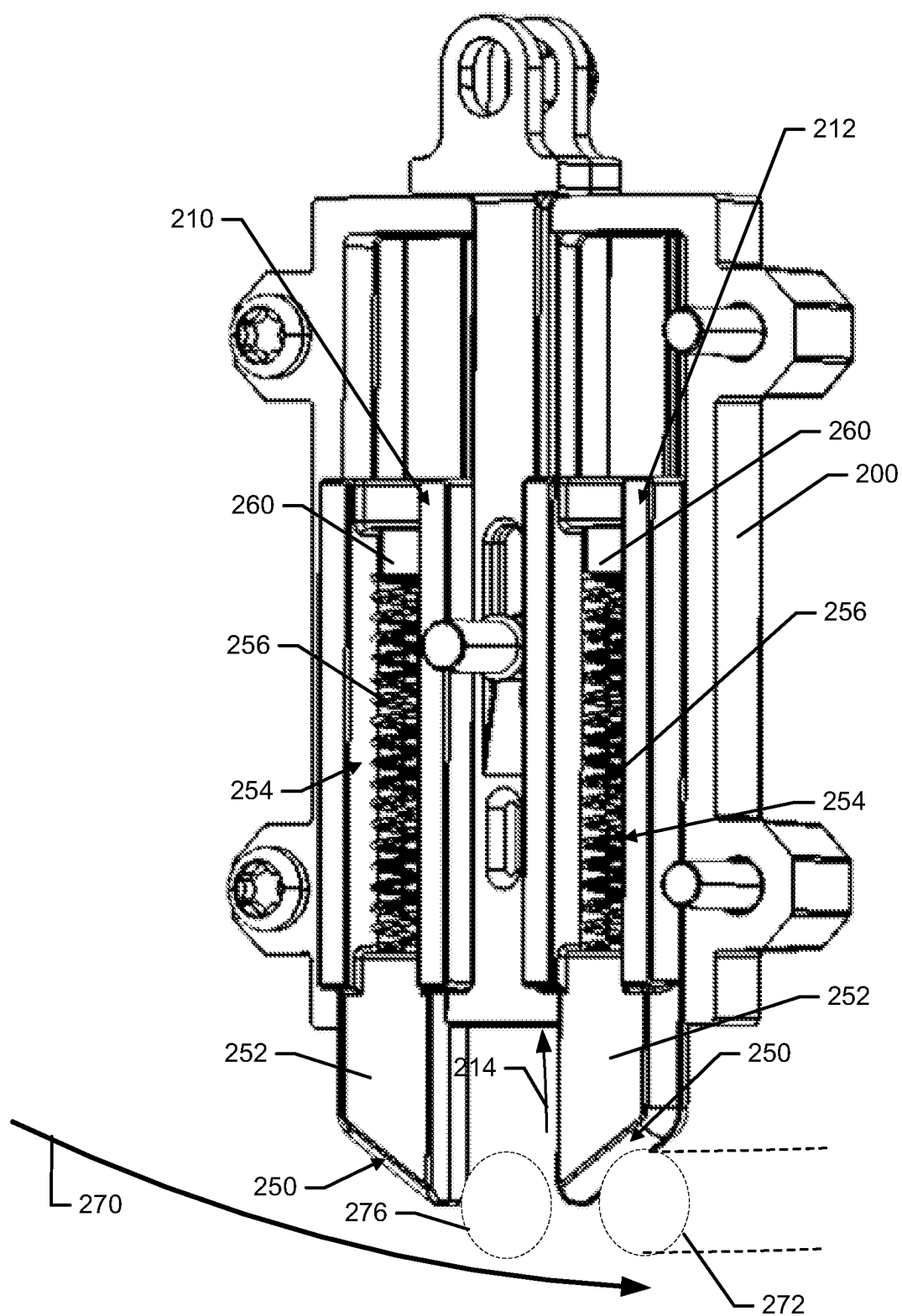
FIG. 8 shows the automatic lock with half of the housing thereof removed in accordance with an example embodiment.
Figure 9:
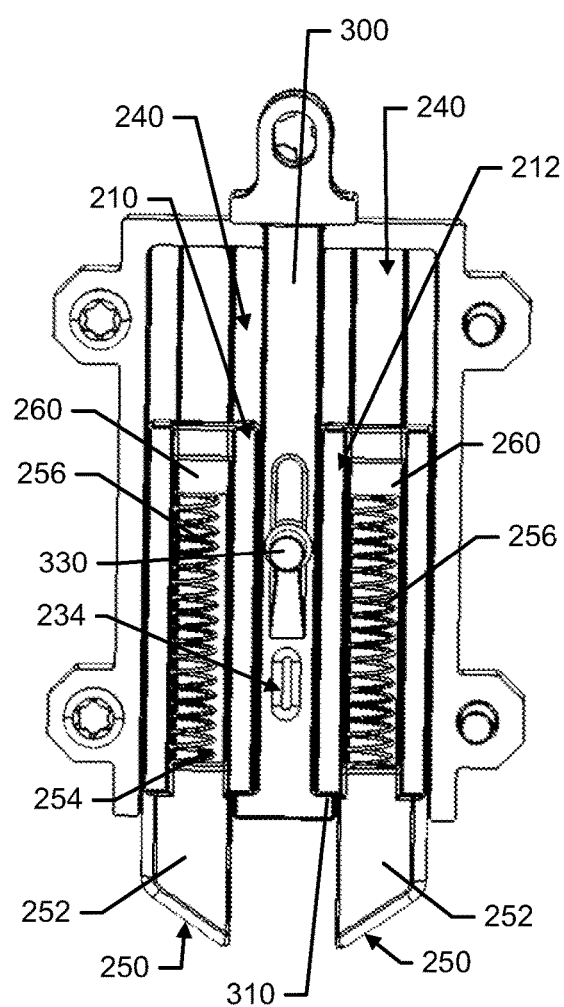
FIG. 9 shows the automatic lock with half of the housing removed to show internal components thereof in the capture position in accordance with an example embodiment.
Figure 10:
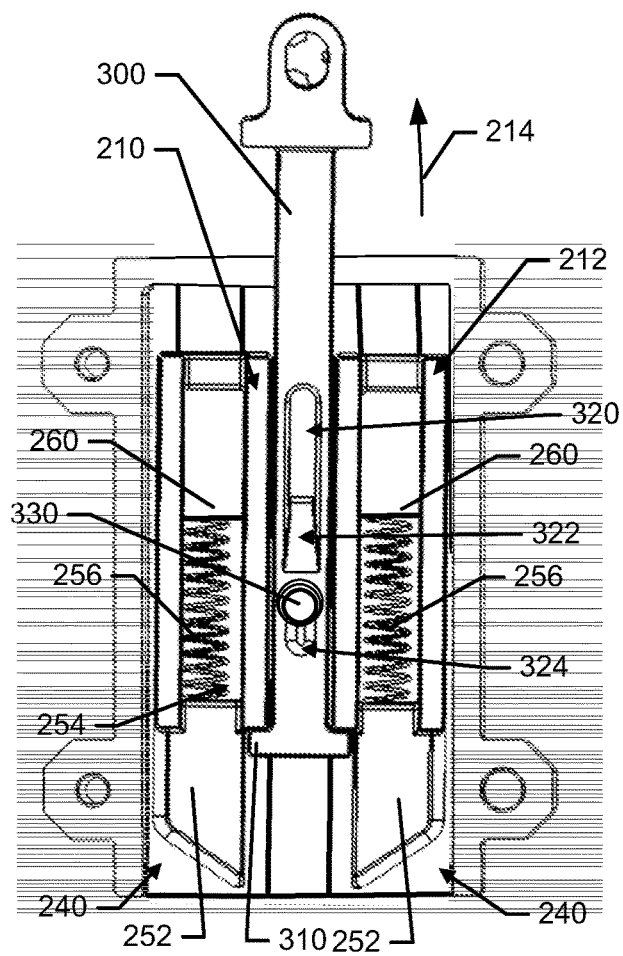
FIG. 10 shows the automatic lock with half of the housing removed to show internal components thereof in the release position in accordance with an example embodiment.
Figure 11:
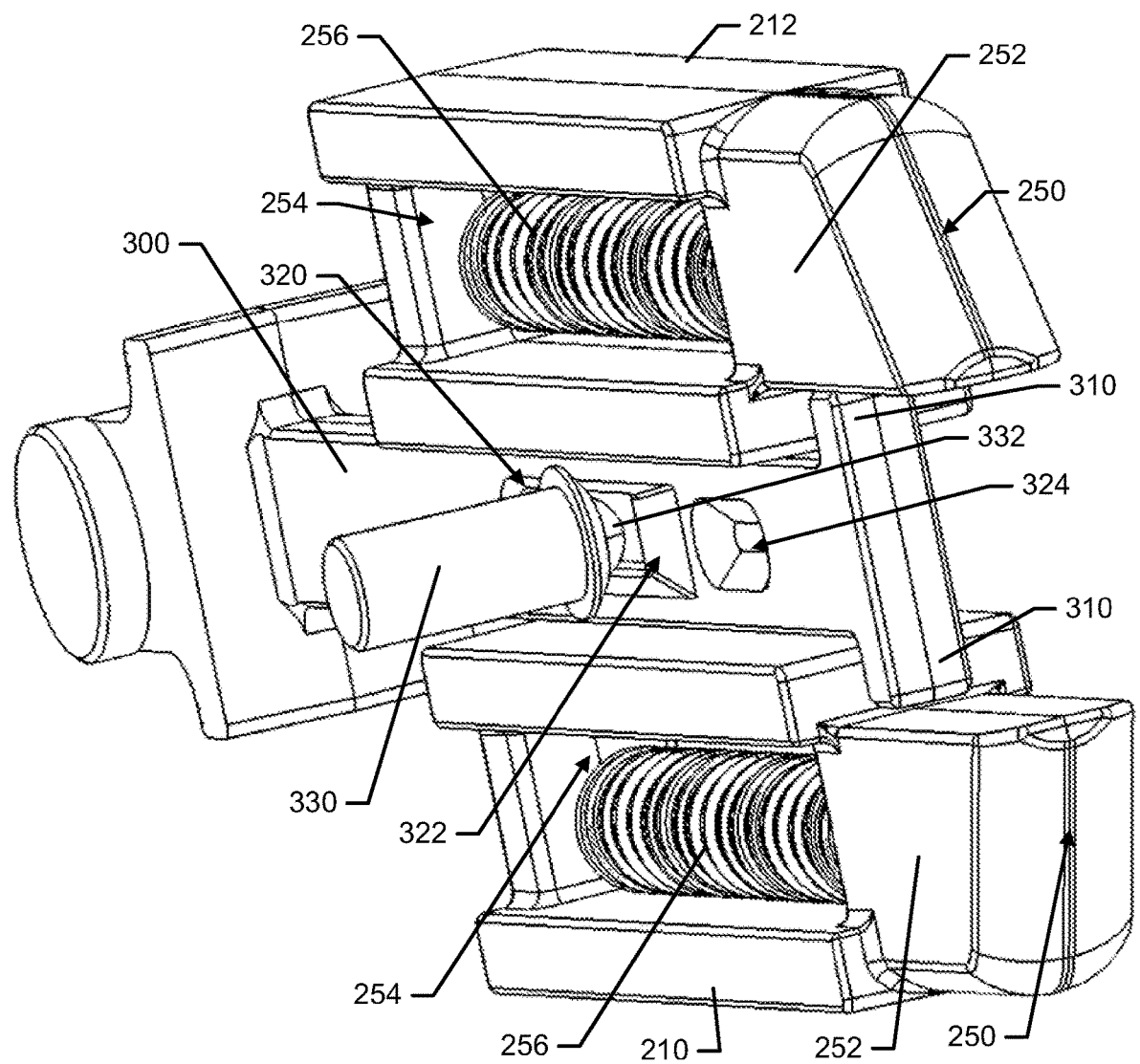
FIG. 11 is a perspective view of internal components of the automatic lock in isolation in accordance with an example embodiment.

FIG. 7 shows a perspective view of the automatic lock 110 in accordance with an example embodiment. FIG. 8 illustrates the automatic lock 110 with one half of the housing 200 removed to reveal internal components of the automatic lock 110 in accordance with one example embodiment. FIGS. 7 and 8 will be used to describe operation of the automatic lock 110 when the door body 54 returns to the closed state while the automatic lock is in the capture position. Meanwhile, FIGS. 9 and 10 show the automatic lock 110 with the first and second capture elements 210 and 212 in the capture position and the release position, to facilitate a description of the shift between the capture position and the release position. FIG. 11 illustrates a perspective view of some internal parts of the automatic lock 110 to further explain certain aspects of operation of the automatic lock 110.

Referring first to FIGS. 7 and 8, it can be seen that the housing 200 (or at least one half thereof) includes receiving tracks 240 for the first and second capture elements 210 and 212. In this regard, there is one instance of receiving tracks 240 on each lateral side of the housing 200 and the receiving tracks 240 form a void space inside which the first and second capture elements 210 and 212 can move upward and downward.

The first and second capture elements 210 and 212 each include a ramp surface 250 at a distal end thereof. The ramp surfaces 250 are angled to face away from each other, and are located on a projection 252 that is capable of engaging the bolt 100 when the projections 252 of the first and second capture elements 210 and 212 extend out of the housing 200. The first and second capture elements 210 and 212 each also include a longitudinally extending retaining slot 254 inside which a biasing member (e.g., spring 256) is located. The springs 256 extend from the projection 252 to a stop member 260 that is located in the receiving tracks 240 of the housing 200. Thus, as can be appreciated from FIG. 8, any upward movement of one either one of the projections 252 in the corresponding one of the receiving tracks 240 may cause the spring 256 in the corresponding retaining slot 254 to be compressed between the projection 252 and the stop member 260. When any force moving the projection 252 upward (in the direction of arrow 214) or retaining the projection 252 in a position that compresses the spring 256 is removed, the spring 256 will unload itself and move the projection downward (in a direction opposite the direction of arrow 214).

Accordingly, for example, as shown in FIG. 8, if the door body 54 is allowed to pivot from an opened position toward the closed state (e.g., in a swinging direction shown by arrow 270), the bolt 100 may initially contact the ramp surface 250 of the second capture element 250 (at a position of the bolt 100 shown by dashed circle 272). The bolt 100 will then ride (e.g., due to the weight of the door body 54 and corresponding momentum cause be gravity acting on the door body 54) along the ramped surface 250 and will overcome the spring 256 to compress the spring 256 as the second capture element 212 moves upwardly into the housing 200 along the receiving track 240. The bolt 100 will then pass by the second capture element 212 and into the space between the first and second capture elements 210 and 212 and strike the side of the first capture element 210 that is opposite the ramped surface 250 of the first capture element 210 thereby stopping movement of the door body 54 in the direction of arrow 270. Meanwhile, the spring 256 will unload after the bolt 100 clears the second capture element 210 and the projection 252 of the second capture element 212 will move downward (in a direction opposite arrow 214) to return to the position shown in FIGS. 7 and 8. To the extent the bolt 100 bounces off of the first capture element 210 and moves in a direction opposite that of arrow 270, the second capture element 212 will deflect the bolt 100 rearward to retain the bolt 100 in the space between the first and second capture elements 210 and 212. The magnets 120 and 122 will cause the movement of the door body 54 to stop and the bolt 100 will be retained at the location shown by dashed circle 276.

Notably, all of the actions described in reference to FIGS. 7 and 8 occur while the automatic lock 110 is in the capture position. While transition toward the release position was shown and described in reference to FIG. 6, FIG. 10 illustrates the automatic lock 110 fully in the release position. Moreover, it can be appreciated from FIGS. 6 and 10 that movement of the motor 130 may cause corresponding movement of a carrier assembly 300 of the automatic lock 110. The carrier assembly 300 may be operably coupled to the motor 130 at a proximal end thereof, and may be operably coupled to the first and second capture elements 210 and 212 (while extending therebetween) at a distal end of the carrier assembly 300. In this example, the distal end of the carrier assembly 300 may include lift arms 310 that engage a portion of the first and second capture elements 210 and 212 and retain the first and second capture elements 210 and 212 in the receiving tracks 240 against the force of the springs 256 (which would otherwise force the first and second capture elements 210 and 212 out of the housing 200.

The carrier assembly 300 further includes a slot 320, a ramp 322 and a retaining well 324. The slot 320, the ramp 322 and the retaining well 324 may each extend along a longitudinal centerline of the carrier assembly 300. A holding bolt 330 may be retained by the housing 200, and may have a ball member 332 facing internally (toward the carrier assembly 300). The ball member 332 may be configured to ride in the slot 320 when the carrier assembly 300 is located in a position that corresponds to the capture position (shown in FIG. 9). This may represent the farthest downward travel of the carrier assembly 300, and the carrier assembly 300 may be moved to this position by the motor 130. When the opening trigger is received, as mentioned above, the motor 130 may operate to draw the automatic lock 110 out of the capture position and into the release position (shown in FIG. 10). The motor 130 may therefore draw the proximal end of the carrier assembly 300 upward (as shown by arrow 340 in FIG. 10) and correspondingly also carry the first and second capture elements 210 and 212 upward to retract them inside the housing 200. The ball member 332 may slide along the ramp 322 and into the retaining well 324 as the motor 130 draws the carrier assembly 300 upward relative to the housing 200. When the motor 130 has moved the carrier assembly 300 to the position shown in FIG. 10, the motor 130 may stop operation in order to limit the power consumed by the motor 130. The fact that the motor 130 does not stay on through the entire cycle can save power and therefore extend the life of a battery, if the power supply 132 is a battery. Although the power of the motor 130 is off, and the springs 256 are compressed, the interaction between the retaining well 324 and the ball member 322 may hold the carrier assembly 300 in the release position shown in FIG. 10.

When the motor 130 is operated to transition the automatic lock 110 to the capture position (of FIG. 9), responsive to receipt of the closing trigger, the carrier assembly 300 is moved downward (in a direction opposite that of arrow 340). The downward movement pushes the ball member 332 out of the retaining well 324 and onto the ramp 322. When the ball member 332 reaches the ramp 322, the springs 326 may push against the stop member 260 and unload to extend the first and second capture elements 210 and 212 back to the capture position of FIG. 9. As an alternative to the ball member 332, other spring loaded or energy storing devices may be employed. For example, any spring loaded catch that fits into a detent may be employed including a ball plunger, a plastic or Delrin feature molded into an assembly to fit into a detent on a separate puller piece, a flat metal piece attached to a spring that interferes with a detent on the outside of a puller assembly, etc.

As noted above, the motor 130 may operate responsive to instructions from the controller 140, and the controller 140 may receive the opening trigger and closing trigger from the vehicle detector 150 and the motion detector 160, respectively. The vehicle detector 150 may take numerous forms. For example, the vehicle detector 150 may be wireless detector in some cases. In such examples, the vehicle detector 150 may detect the robotic vehicle 10 without any physical contact between the robotic vehicle 10 and the selectively operable door 50.

In other examples, the vehicle detector 150 may require physical contact for detection of the robotic vehicle 10, so the vehicle detector 150 may be considered to be a mechanical or physical detector. One such example of a physical detector may include the provision of a mechanical switch on each side of the selectively operable door 50. For example, the interface member 58 of FIG. 2 may be an example of a physical detector since the interface member 58 may be actuated when contact is made with the robotic vehicle 10. Effectively, the interface member 58 may act as a mechanical switch that is triggered when the robotic vehicle 10 engages the interface member 58. The switch may be synchronized to the controller 140 in the door body 54 (thereby providing the opening trigger) to enable the controller 140 to direct the motor 130 to operate the automatic lock 110 as described above to shift the first and second capture elements 210 and 212 to the release position when contact is detected. When the motion detector 160 of FIG. 3 detects motion of the door body 54 beyond a predetermined amount (e.g., 30 degrees), the controller 140 may receive the closing trigger, and may instruct the motor 130 to operate in the reverse direction (e.g., as described above) to transition the automatic lock 110 to the capture position. As the door body 54 swings shut, one of the first or second capture elements 210 or 212 will be displaced as described above in reference to FIG. 8 to resume capture of the bolt 100. The interface member 58 could also take other physical forms at the door body 54 (or proximate thereto) and may be located in a mechanical assembly or housing that shields the interface member 58 from interaction with natural debris, weather or animals.

As another alternative, the interface member 58 may be an open electrical circuit that is closed by physical contact with the robotic vehicle 10. In this regard, for example, electrical contacts may be provided at the interface member 58 to interact with an electrically conductive portion or strip on the front of the robotic vehicle 10. When the robotic vehicle 10 hits the interface member 58, the open circuit of the interface member 58 may be closed to provide the opening trigger to the controller 140 to transition the automatic lock 110 to the release position as discussed above. After the robotic vehicle 10 displaces the door, and the circuit is no longer closed, the automatic lock 110 may also shift back to the capture position as also described above.

Figure 12:
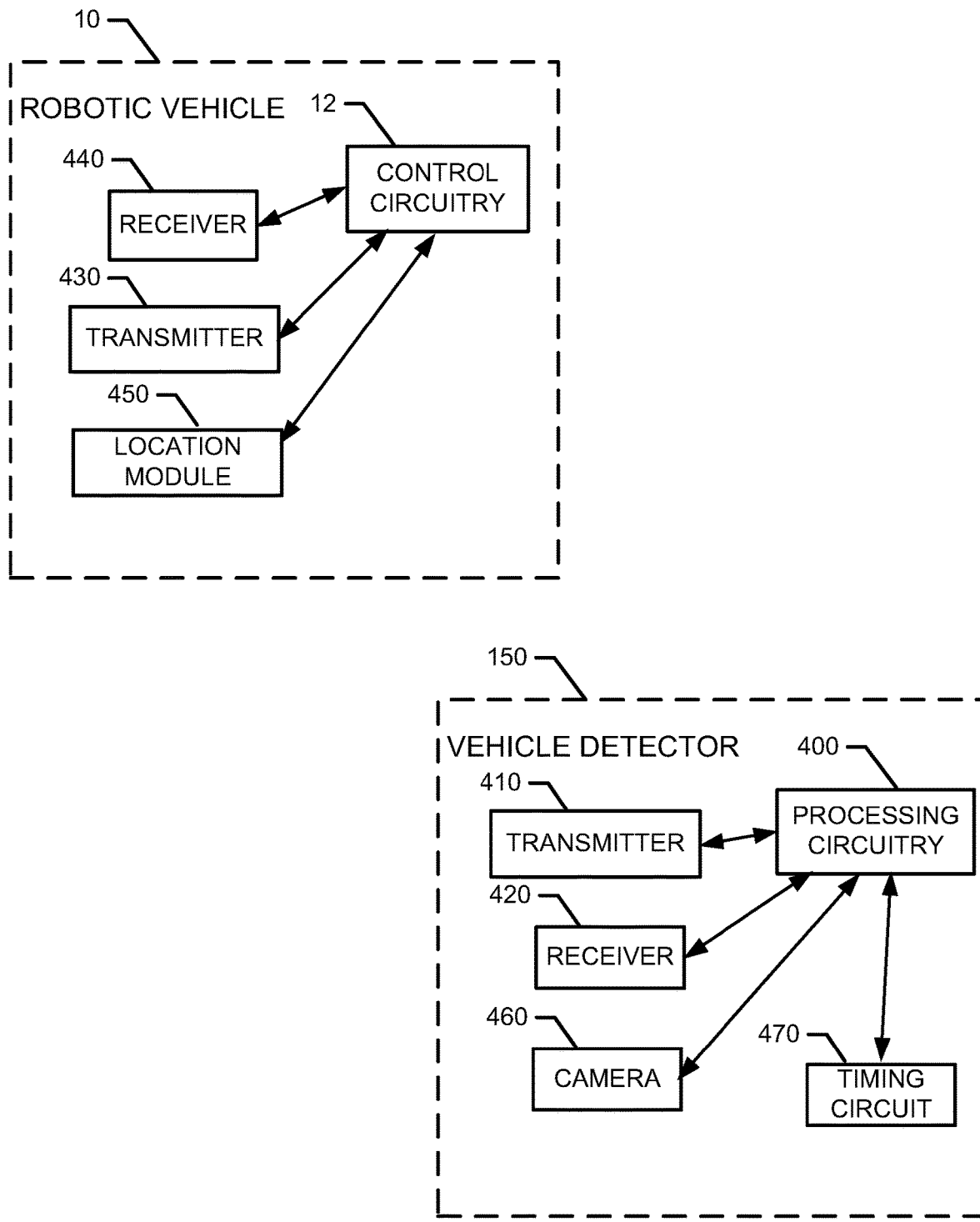
FIG. 12 is a block diagram of various components of a robotic vehicle and vehicle detector in accordance with an example embodiment.

FIG. 12 illustrates a block diagram of example structures that may be employed to provide a wireless detector for the vehicle detector 150 of some example embodiments. Notably, the components shown in FIG. 12 are merely examples of some components that may be used in connection with some example embodiments. Other structures are also possible. Moreover, some embodiments may use fewer than all of the components shown in FIG. 12 and/or may use selected ones of such components in any combination. Other components may also be substituted or added to those shown in FIG. 12 in some cases.

Referring now to FIG. 12, the robotic vehicle 10 may include control circuitry 12, as discussed above. The vehicle detector 150 may include processing circuitry 400, which may be similar in form and/or function to the control circuitry 12 of the robotic vehicle 10, for example, insofar as each may include a processor and memory that may be programmable to define corresponding operable functions of the respective devices. The control circuitry 12 and processing circuitry 400 may each be configured to perform data processing or control function execution and/or other processing and management services according to an example embodiment of the present invention. In some embodiments, the control circuitry 12 and processing circuitry 400 may each be embodied as a chip or chip set. In other words, the control circuitry 12 and processing circuitry 400 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The control circuitry 12 and processing circuitry 400 may therefore, in some cases, be configured to implement an embodiment of the present invention on a single chip or as a single "system on a chip." As such, in some cases, a chip or chipset may constitute means for performing one or more operations for providing the functionalities described herein. Thus, for example, the control circuitry 12 and processing circuitry 400 may include one or more instances of a processor and memory. In some cases, the processing circuitry 400 of the vehicle detector 150 may be shared with or distinct from corresponding processing circuitry of the controller 140.

In an example embodiment, the processing circuitry 400 of the vehicle detector 150 may include or otherwise be in communication with (e.g., may be operably coupled to) a transmitter 410 and/or receiver 420. Similarly, the control circuitry 12 of the robotic vehicle 10 may include or otherwise be in communication with (e.g., may be operably coupled to) a transmitter 430 and/or receiver 440. The interactions and structures used to embody selective ones of these transmitters and receivers may define a number of different specific ways that the vehicle detector 150 may be defined as a wireless detector.

In one example embodiment, the wireless detector may be embodied as a Bluetooth or Bluetooth Low Energy (BLE) detector. In such an example, the transmitter 430 of the robotic vehicle 10 may transmit a relatively low power signal (e.g., Bluetooth or other low power signals) that is detectable by the receiver 420 of the vehicle detector 150 when the robotic vehicle 10 is within range. There may be no need for or existence of the receiver 440 or transmitter 410 in this particular example embodiment. The distance at which the low power signal is detectable may be adjustable by adjusting the power level of the transmitter 430. The receiver 420 of the vehicle detector 150 may have a predefined signal detection threshold (e.g., a certain received signal strength indicator (RSSI) that is sufficient to be considered as an opening trigger. Thus, for example, the receiver 420 may either be configured to generate the opening trigger responsive to any receipt of the low power signal, or only responsive to receipt of the low power signal above a predefined threshold.

In some cases, the transmitter 430 may further be shielded (e.g., on sides and the rear of the robotic vehicle 10) so that the signal transmitted is strongest directly in front of the robotic vehicle 10. Thus, the robotic vehicle 10 may pass close to the selectively operable door 50 without triggering an unlock event unless the robotic vehicle 10 is headed directly (or nearly directly) toward the selectively operable door 50. The shielding may therefore provide a type of angle of approach (AOA) detection may be a further component of the process used to generate the opening trigger. Another AOA detection paradigm may be employed by making the receiver 420 at the vehicle detector 150 capable of discerning AOA based on signal reception. In this regard, for example, the receiver 420 may actually be embodied by two spaced apart receivers located at the door body 54 (or door frame 52) in different parts thereof. The signal received from the transmitter 430 may therefore be received at slightly different times based on the AOA, and the timing difference may be used to calculate the AOA. If the AOA is outside a certain range (e.g., a range of values indicating likely intent of the robotic vehicle 10 to pass through the selectively operable door 50), then no opening trigger may be initiated. However, if the AOA is within the certain range of values, then the opening trigger may be initiated.

The wireless detector may alternatively be embodied as a radio frequency identifier (RFID) reader in some cases. In such an example, the transmitter 410 of the vehicle detector 150 may be configured to transmit a signal that may be received (e.g., by receiver 440) at a passive RFID tag on the robotic vehicle 10. The RFID tag may respond to the signal received by transmitting, and the transmission from the RFID tag may be received by the receiver 420 of the vehicle detector 150 indicating the presence of the robotic vehicle 10 within a short distance of the selectively operable door 50 to generate the opening trigger. As an alternative, the RFID tag may be an active tag instead of a passive tag. In either case, an RFID reader may be in the door frame 52 or the door body 54 and may read the RFID tag as the robotic vehicle 10 approaches the selectively operable door 50 to generate the opening trigger.

An example employing RFID techniques may also use the AOA techniques similar to those described above to increase accuracy. In this regard, for example, the robotic vehicle 10 may have two passive or active RFID tags located thereat. Each of the two RFID tags may have a unique identity or identifier, and may be placed on opposite sides (e.g., right and left) of the robotic vehicle 10. As the robotic vehicle 10 approaches the selectively operable door 50, the vehicle detector 150 may record a difference in the time that the signals were received from each of the RFID tags in order to determine the AOA based on the time difference. Alternatively, the two RFID tags could be located at the selectively operable door 50 and the reader may be located at the robotic vehicle 10. In such alternative, the calculation may be similarly performed to generate AOA, except that the roles and locations of the components involved in the calculation are reversed.

In another example embodiment, the wireless detector may be embodied as a time of flight (TOF) sensor. In such an example, each side of the door body 54 may have an instance 5 of the transmitter 410 thereon (or the transmitter 410 may be omni or bi-directional). The transmitter 410 may generate a signal that bounces off the robotic vehicle 10 and is returned and received at the receiver 420. The TOF may be calculated and a range may be determined from the calculation. If the range is decreasing at a rate that indicates that the robotic vehicle 10 is heading toward the selectively operable door 50, the opening trigger may be generated. In some cases, AOA may be integrated into the calculation by using a known speed of the robotic vehicle 10, and the rate at which range is decreasing to the selectively operable door 50. In this regard, by comparing the rate of range closure to the known speed of the robotic vehicle 10, the AOA can be determined to see if the approach of the robotic vehicle 10 is direct, and therefore more likely to be made with intent to pass through the selectively operable door 50 rather than simply performing a cutting operation in the vicinity of the selectively operable door 50.

In some embodiments, wireless detection may be accomplished via a combination of components that accurately track the location of the robotic vehicle 10. For example, the robotic vehicle 10 may include a location module 450 configured to accurately determine the location of the robotic vehicle 10. The location module 450 may be a GPS receiver or may employ real time kinematic (RTK) GPS positioning or any other suitable means by which to accurately obtain location information in real time (e.g., GPS, GLONASS, Galileo, GNSS, and/or the like). The location information may then be transmitted (e.g., via transmitter 430) to the receiver 420 of the vehicle detector 150. The vehicle detector 150 may then (e.g., via the processing circuitry 400) determine whether the robotic vehicle 10 is intended to pass through the selectively operable door 50 and cause a transition to the release condition, as described above. The communication from the transmitter 430 to the receiver 420 may be direct or indirect. Thus, for some examples, a wireless network component (e.g., a WiFi/Bluetooth/cellular connection via a hotspot, access point, cell site, or the like) may be interposed between the transmitter 430 and receiver 420.

As another alternative, wireless detection may be accomplished visually. For example, the vehicle detector 150 may be embodied as or include a camera 460, and the camera 460 may enable visual recognition techniques to be employed to act as the opening trigger. In such cases, for example, one or more cameras may be mounted at the selectively operable door 50. The camera 460 may be configured to initiate the opening trigger responsive to visually identifying the robotic vehicle 10 in a specific location or on a recognized trajectory that, in either case, is understood to have a high probability of corresponding to an intent of the robotic vehicle 10 to pass through the selectively operable door 50. However, in some cases, the camera 460 may have a focus point that is relatively close to the selectively operable door 50, and the camera 460 may be configured to read indicia that may be provided on a body of the robotic vehicle 10. If the robotic vehicle 10 is at the focus point and the indicia is readable, it may be clear that the robotic vehicle 10 has moved toward the selectively operable door 50 with the intent to pass through. The camera 460 may, in some cases, be located in the interface member 58. However, the camera 460, if employed, could also be at other locations on or near the selectively operable door 50.

In some embodiments, the opening trigger may be initiated via magnetic triggering. For example, the interface member 58 or another portion of the selectively operable door 50 may include a Hall effect sensor or magnetic reed switch. In such an example, the robotic vehicle 10 may emit a magnetic field over a relatively short range (e.g., to keep power level and battery consumption low, or to facilitate use of small permanent magnets). The magnetic emitter of the robotic vehicle 10 may be considered as the transmitter 430 of FIG. 12. If the robotic vehicle 10 moves close enough to the selectively operable door 50 to enable the receiver 420 (e.g., Hall effect sensor or magnetic reed switch) of the vehicle detector 150 to detect the magnetic field emitted by the robotic vehicle 10, the opening trigger may be initiated.

In some embodiments, the transmitter 430 and receiver 440 may be portions of an internal electronic communication system and/or execute an internal electronic communication protocol inside the robotic vehicle 10. One non-limiting example of such a system/protocol may include a universal asynchronous receiver-transmitter (UART). Regardless of how implemented, the internal electronic communication system may be configured to follow a guide wire to the selectively operable door 50. When the robotic vehicle 10 has found and is following the guide wire, the robotic vehicle 10 may clearly be headed toward the selectively operable door 50 for passage therethrough. In such an example, the internal electronic communication system may have corresponding predetermined conditions associated therewith, which may cause generation of the opening trigger. For example, the opening trigger for the selectively operable door 50 may be generated when the robotic vehicle 10 is following the guide wire.

For any of the mechanisms described above, via which the opening trigger may be initiated, it is desirable for the selectively operable door 50 to remain unlocked for as little time as possible after the opening trigger is initiated so that power consumed to unlock and/or open the selectively operable door 50 can be minimized. False triggers and any power associated with holding a condition (e.g., the release position) are therefore desirable to be kept to a minimum. Accordingly, as noted above, the selectively operable door 50 may be configured to minimize power consumption by operating the motor 130 only to transition the automatic lock 110 to the release position. Thereafter, the design of the automatic lock 110 causes the release position to be held without any power consumption by the motor 130 until an actual event associated with movement of the robotic vehicle 10 through the selectively operable door 50 (e.g., swinging of the door body 54 of a predetermined amount) causes the motor 130 to operate again only long enough to return the automatic lock 110 to the release position.

In some cases, a timing circuit 470 may be provided at the vehicle detector 150 and if the opening trigger is received, the timing circuit 470 may begin to count for a threshold amount of time. When the threshold amount of time has elapsed, if the door body 54 has not moved sufficient to initiate a release trigger, the timing circuit 470 may provide a signal to the controller 140 and the controller 140 may cause the motor 130 to operate to transition the automatic lock 110 to the capture position to ensure that the door body 54 is no longer free to move.

In some embodiments, to further ensure that unwanted unlocks are avoided, the robotic vehicle 10 may be configured to overtly signal an intent to transition through the selectively operable door 50. In such an example, the transmitter 430 of the robotic vehicle 430 may only be powered and therefore enabled to transmit (regardless of the type of transmission) when the robotic vehicle 10 intends to transit through the selectively operable door 50. Movement of the door body 54 may then be detected (e.g., instead of detecting any door position itself) to transition from release position to capture position. As noted above, the movement of the door body 54 may be accomplished via an accelerometer. However, other sensors could alternatively be employed to sense door movement, door location relative to the frame or displacement including, for example, magneto resistive sensors, Hall effect sensors, inductive sensors, infrared sensors, optical sensors, physical switches, or RFID tags or other near field communication (NFC) tags. In some cases, the sensors may be specifically tailored to detecting door angle or detecting rotation of the door. Such sensors may include, for example, potentiometers (e.g., rotary on the axis or hinge of the door body 54 or linear potentiometers on a spring loaded plunger with a cam to show relative degree of rotation), momentary plunger switch with a cam to trigger on a specific angle or range of angles, optical angular sensors, mechanical rotary sensors, angular Hall effect sensors, a mercury angle switch, or inertial measurement units (IMU) such as magnetometer or gyroscope.

In an example embodiment, a selectively operable door for passage of a robotic vehicle may be provided. The selectively operable door may include a door frame disposable in a barrier dividing two areas in which the robotic vehicle is enabled to travel, a door body hingedly connected to the door frame, and a latching assembly configured to alternately allow movement of the door body such that the robotic vehicle to enabled to pass through the selectively operable door via displacement of the door body and prevent movement of the door body such that the door body is retained in a closed state. The latching assembly may include an automatic lock configured to define a release position in which movement of the door body from the closed state is allowed, and a capture position in which movement of the door body to the closed state is allowed and movement of the door body from the closed state is prevented.

The selectively operable door of some embodiments may include additional features, modifications, augmentations and/or the like to achieve further objectives or enhance performance of the selectively operable door. The additional features, modifications, augmentations and/or the like may be added in any combination with each other. Below is a list of various additional features, modifications, and augmentations that can each be added individually or in any combination with each other. For example, the automatic lock may be disposed at the door body and a bolt of the latching assembly extends from the door frame toward the automatic lock. In an example embodiment, the automatic lock may include a first capture element and a second capture element. The first and second capture elements may extend on opposite sides of the bolt when the door body is in the closed state, and the first and second capture elements may be withdrawn into a housing of the automatic lock in the release position. In some cases, each of the first and second capture elements may include a ramp surface at a distal end thereof, the ramp surfaces being angled to face away from each other. In response to the door body swinging toward the closed state while the automatic lock is in the capture position, a corresponding one of the ramp surfaces rides along the bolt to displace a respective one of the first and second capture elements toward the housing to enable the door body to return to the closed state. In an example embodiment, the first and second capture elements may be biased toward the extended position, and a carrier assembly operable by a motor may overcome the biasing of the first and second capture elements to transition the automatic lock to the release position. In some cases, the carrier assembly may include a retaining well configured to interface with a ball member to hold the automatic lock in the release position until returned to the capture position by operation of the motor. In an example embodiment, the automatic lock may be operably coupled to a motor, which may be configured to operate the automatic lock to the release position responsive to an opening trigger and to the capture position responsive to a closing trigger. In some cases, the motor may be configured to turn off responsive to completing a cycle to transition the automatic lock between the release position and the capture position. The automatic lock may be biased toward the capture position, and the automatic lock may be configured to be retained in the release position when the motor is off after the motor transitions the automatic lock to the release position. In an example embodiment, the motor and the automatic lock may each be disposed within the door body. In some cases, the opening trigger may be received wirelessly via transmission of a signal from the robotic vehicle to a vehicle detector located at the door body. In an example embodiment, the signal is received at two locations with a time difference therebetween, and the time difference may enable a determination of an angle of approach of the robotic vehicle toward the door body. In some cases, the opening trigger may be received wirelessly based on location information specifying a location of the robotic vehicle relative to the door body. In an example embodiment, the opening trigger may be received wirelessly based on reading an radio frequency identification (RFID) tag associated with the robotic vehicle. In an example embodiment, the opening trigger may be received wirelessly based on a receiver at the door body reading a magnetic signature generated by the robotic vehicle. In an example embodiment, the opening trigger may be received wirelessly a camera detecting movement of the robotic vehicle toward the door body. In some cases, the opening trigger may be received based on a physical interaction between a portion of the door body and the robotic vehicle. In an example embodiment, the physical interaction may include the robotic vehicle activating a switch located at the door body or a conductive component of the robotic vehicle closing an open circuit at the door body by contact with the door body. In an example embodiment, the automatic lock may be transitioned from the release position to the capture position responsive to movement of the door body by at least a predetermined amount away from the closed state. In some cases, the door may further include a movement sensor configured to detect the movement of the door body. In an example embodiment, the movement sensor may include an accelerometer configured to detect at least a thirty degree movement of the door from the closed state.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A selectively operable door for passage of a robotic vehicle, the selectively operable door comprising:
    a door frame disposable in a barrier dividing two areas in which the robotic vehicle is enabled to travel;
    a door body hingedly connected to the door frame; and
    a latching assembly configured to alternately allow movement of the door body such that the robotic vehicle to enabled to pass through the selectively operable door via displacement of the door body and prevent movement of the door body such that the door body is retained in a closed state,
    wherein the latching assembly comprises an automatic lock configured to define a release position in which movement of the door body from the closed state is allowed, and a capture position in which movement of the door body to the closed state is allowed and movement of the door body from the closed state is prevented,
    wherein the automatic lock is disposed at the door body and a bolt of the latching assembly extends from the door frame toward the automatic lock,
    wherein the automatic lock comprises a first capture element and a second capture element,
    wherein the first and second capture elements extend on opposite sides of the bolt when the door body is in the closed state, and
    wherein the first and second capture elements are withdrawn into a housing of the automatic lock in the release position.

2. The selectively operable door of claim 1, wherein each of the first and second capture elements includes a ramp surface at a distal end thereof, the ramp surfaces being angled to face away from each other, and
    wherein, in response to the door body swinging toward the closed state while the automatic lock is in the capture position, a corresponding one of the ramp surfaces rides along the bolt to displace a respective one of the first and second capture elements toward the housing to enable the door body to return to the closed state.

3. The selectively operable door of claim 1, wherein the first and second capture elements are biased toward the extended position, and
    wherein a carrier assembly operable by a motor overcomes biasing of the first and second capture elements to transition the automatic lock to the release position.

4. The selectively operable door of claim 3, wherein the carrier assembly comprises a retaining well configured to interface with a ball member to hold the automatic lock in the release position until returned to the capture position by operation of the motor.

5. The selectively operable door of claim 1, wherein the automatic lock is operably coupled to a motor, the motor being configured to operate the automatic lock to the release position responsive to an opening trigger and to the capture position responsive to a closing trigger.

6. The selectively operable door of claim 5, wherein the motor is configured to turn off responsive to completing a cycle to transition the automatic lock between the release position and the capture position,
    wherein the automatic lock is biased toward the capture position, and
    wherein the automatic lock is configured to be retained in the release position when the motor is off after the motor transitions the automatic lock to the release position.

7. The selectively operable door of claim 5, wherein the motor and the automatic lock are each disposed within the door body.

8. The selectively operable door of claim 5, wherein the opening trigger is received wirelessly via transmission of a signal from the robotic vehicle to a vehicle detector located at the door body.

9. The selectively operable door of claim 8, wherein the signal is received at two locations with a time difference therebetween, and
    wherein the time difference enables a determination of an angle of approach of the robotic vehicle toward the door body.

10. The selectively operable door of claim 5, wherein the opening trigger is received wirelessly based on:
    location information specifying a location of the robotic vehicle relative to the door body;
    reading an radio frequency identification (RFID) tag associated with the robotic vehicle;
    a receiver at the door body reading a magnetic signature generated by the robotic vehicle; or
    a camera detecting movement of the robotic vehicle toward the door body.

11. The selectively operable door of claim 5, wherein the opening trigger is received based on a physical interaction between a portion of the door body and the robotic vehicle.

12. The selectively operable door of claim 11, wherein the physical interaction comprises the robotic vehicle activating a switch located at the door body.

13. The selectively operable door of claim 11, wherein the physical interaction comprises a conductive component of the robotic vehicle closing an open circuit at the door body by contact with the door body.

14. The selectively operable door of claim 1, wherein the automatic lock is transitioned from the release position to the capture position responsive to movement of the door body by at least a predetermined amount away from the closed state.

15. The selectively operable door of claim 14, further comprising a movement sensor configured to detect the movement of the door body.

16. The selectively operable door of claim 15, wherein the movement sensor comprises an accelerometer configured to detect at least a thirty degree movement of the door from the closed state.

17. A system for enabling a robotic vehicle to pass between two areas divided by a barrier, the system comprising:
 a robotic vehicle; and
 a selectively operable door for passage of the robotic vehicle through the barrier, the selectively operable door comprising:
  a door frame disposed in the barrier;
  a door body hingedly connected to the door frame; and
 a latching assembly configured to alternately allow movement of the door body such that the robotic vehicle to enabled to pass through the selectively operable door via displacement of the door body and prevent movement of the door body such that the door body is retained in a closed state,
 wherein the latching assembly comprises an automatic lock configured to define a release position in which movement of the door body from the closed state is allowed, and a capture position in which movement of the door body to the closed state is allowed and movement of the door body from the closed state is prevented,
 wherein the automatic lock is operably coupled to a motor, the motor being configured to operate the automatic lock to the release position responsive to an opening trigger and to the capture position responsive to a closing trigger, and
 wherein the opening trigger is received based on a physical interaction between a portion of the door body and the robotic vehicle.

18. The system of claim 17, wherein the robotic vehicle comprises an internal communication system configured to follow a guide wire to the selectively operable door, and
 wherein the robotic vehicle is configured to generate an unlock signal to the latching assembly to transition the automatic lock to the release position in response to the internal communication system following the guide wire.

19. A selectively operable door for passage of a robotic vehicle, the selectively operable door comprising:
 a door frame disposable in a barrier dividing two areas in which the robotic vehicle is enabled to travel;
 a door body hingedly connected to the door frame; and
 a latching assembly configured to alternately allow movement of the door body such that the robotic vehicle to enabled to pass through the selectively operable door via displacement of the door body and prevent movement of the door body such that the door body is retained in a closed state,
 wherein the latching assembly comprises an automatic lock configured to define a release position in which movement of the door body from the closed state is allowed, and a capture position in which movement of the door body to the closed state is allowed and movement of the door body from the closed state is prevented, and
 wherein the automatic lock is disposed at the door body and a bolt of the latching assembly extends from the door frame toward the automatic lock.

* * * * *